S. FABER.
GUN.
APPLICATION FILED NOV. 13, 1908.

944,128.

Patented Dec. 21, 1909.
8 SHEETS—SHEET 7.

Witnesses:
R. C. Bretch
A. A. Olson

Inventor:
Stanislaus Faber
By Joshua R. H. Torr
Attorney.

S. FABER.
GUN.
APPLICATION FILED NOV. 13, 1908.

944,128.

Patented Dec. 21, 1909.
8 SHEETS—SHEET 8.

Witnesses:
R. C. Bretcher
A. A. Olson

Inventor:
Stanislaus Faber
By Joshua R. H. Potts
Attorney.

UNITED STATES PATENT OFFICE.

STANISLAUS FABER, OF CHICAGO, ILLINOIS.

GUN.

944,128.   Specification of Letters Patent.   Patented Dec. 21, 1909.

Application filed November 13, 1908. Serial No. 462,450.

*To all whom it may concern:*

Be it known that I, STANISLAUS FABER, a subject of the Emperor of Austria-Hungary, residing at Chicago, county of Cook, and State of Illinois, have invented certain new and useful Improvements in Guns, of which the following is a specification.

My invention relates to ordnance, and more specifically to improvements in guns and turrets therefor.

The object of my invention is to provide a gun and a turret therefor of such improved construction as to adapt the same to be especially applicable in war-vessels and forts, and in other places where a rotatably mounted gun may be used to advantage.

A further object of my invention is to provide a gun of the character mentioned, the operation of which will be largely automatic.

Other objects will appear hereinafter.

With these objects in view, my invention consists in a gun characterized as above mentioned, and in certain details of construction and arrangements of parts, all as will be hereinafter fully described and particularly pointed out in the claims.

My invention will be more readily understood by reference to the accompanying drawings forming a part of this specification, and in which.

Referring now to the drawings, 1 indicates a pedestal which may be of any ordinary or preferred form. Mounted upon said pedestal and rigidly fixed thereto, preferably by means of bolts 2 is a gear wheel 3. Said gear 3 is provided with an upwardly extending annular concentrically arranged flange 4. The upper surface of said flange is provided with a channel 5, the latter forming a raceway for balls 6. Centrally positioned and having its lower end portion rigidly fixed in said gear 3 is a pivotal pin 8. Pivotally mounted upon said pin 8, the same resting upon the balls 6 is a turret 9, formed of heavy sheet metal, the same being of any suitable shape, but preferably substantially the same as that of a horse-shoe. Resting upon a metal mat 10 provided upon the floor of said turret, the base 11 thereof being provided with a perforation for the reception of said pivotal pin 8 which extends through the same, is the gun carriage 12. 13 indicates a locknut, the same being preferably threaded upon said pivotal pin 8. In order to reduce frictional resistance in the rotation of the turret to a minimum, balls 14 are provided in a race formed in the upper surface of the carriage base 11, upon which balls said nut 13 rests. 15 is a nut-lock the same being in pivotal connection with the pin 8. Said member is adapted to engage radially extending slots 16 provided in the upper surface of said nut 13, thereby obviously serving the purpose stated. Said carriage 12 is rigidly fixed to the turret floor by means of bolts 17 and nuts 18 threaded upon said bolts.

Figures 19, 20, 21, 22, 23, 24, 25, 26:
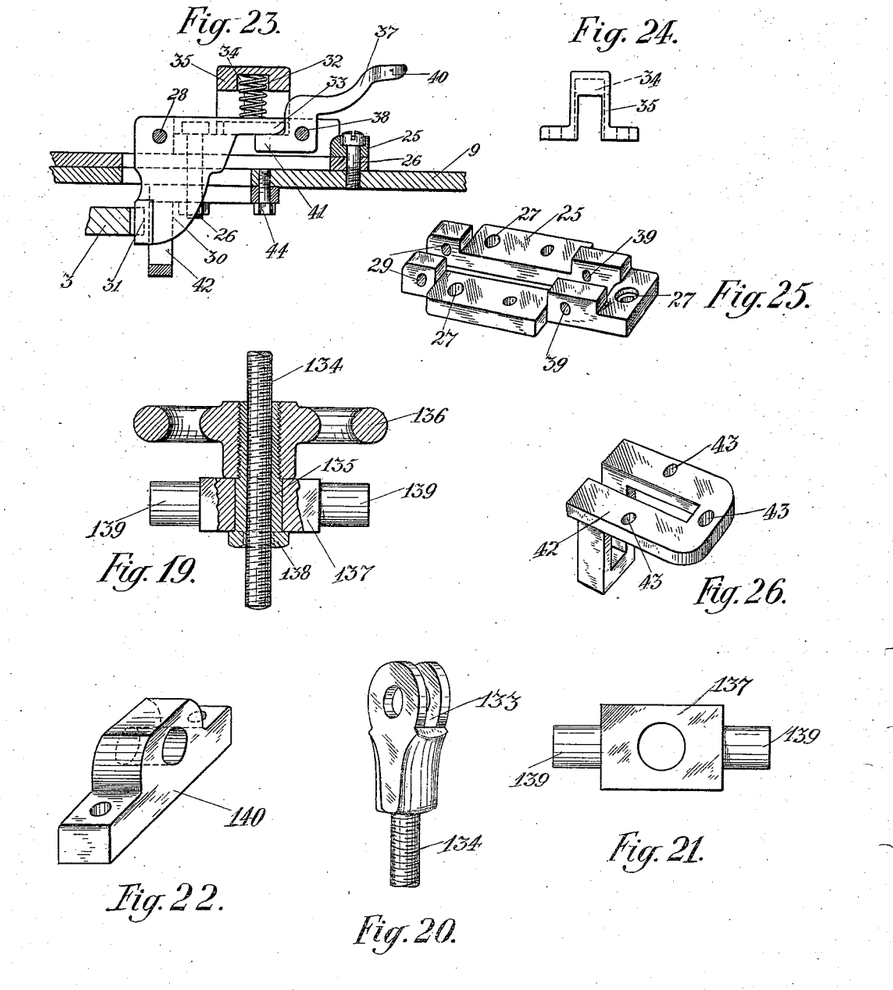
Fig. 19, is an enlarged sectional detail of the gun elevating mechanism.
Figs. 20 and 21 are details of said mechanism.
Fig. 22 is a detail perspective of one of the hinge brackets employed in conjunction with said elevating mechanism.
Fig. 23 is an enlarged section detail of the locking mechanism employed in conjunction with the turret.
Figs. 24, 25 and 26 are details of several of the parts of said mechanism.

Journaled in a bearing 19 the latter being secured by bolts 20 and nuts 21 threaded on said bolts to the turret floor, but fixed against vertical movement therein, is a shaft 22 to the lower end portion of which is fixed a pinion 23 in mesh with the gear-wheel 3. By the provision of a hand-wheel 24 fixed to the upper end portion of the shaft 22, it is obvious that said turret may be readily and easily revolved into any position desired. In order to lock said turret against rotation, in any position desired, I provide a locking mechanism as clearly shown in Fig. 23. Said mechanism consists of a substantially U-shaped base member 25 secured to the turret floor upon the mat 10 by means of bolts 26 passing through perforations 27 provided in said member. Pivotally mounted in said member 25 by means of a pivotal pin 28 the end portions of which rest in perforations 29 provided in said member, is a dog 30. Said dog depends through slots provided in the mat 10 and the turret floor at that point, the lower portion 31 thereof being adapted to normally engage the teeth of the gear-wheel 3, and hence act as a means of locking said turret against rotary movement. Said dog is held in forced contact with said gear by means of a coil spring 32 in engagement with the horizontally extending end portion 33 of said dog, the opposite end portion of said spring resting in a seat 34 provided in a housing 35, the latter being secured by bolts 36 to the member 25. In order to facilitate the disengagement of said dog and said gear, I provide a lever 37 mounted upon a pivotal pin 38, the end portions of which rest in perforations 39 provided in the member 25. By depressing the end portion 40 of said member 37 it is obvious that the end portion 41 thereof will be elevated. Hence, the end portion 33 of the dog 30 will also be elevated thereby causing the portion 31 thereof, to be swung out of engagement with the teeth of the gear 3.

An angular member 42 through perforations 43 provided in which the bolts 26 and a bolt 44 pass acts in the capacity of a reinforcing element for the turret floor as well as a guide for the dog 30. The upper extremities of the carriage arms are formed into bearings 45 in which are rotatably mounted the trunnions 46 of the gun or barrel 47, bearing caps 48 secured to said carriage bearings by means of bolts 49 serving an obvious purpose. Hingedly mounted upon and snugly fitting the horizontally reduced breech 50 of the gun 47, the end portions of the arms 51 thereof being secured by hinge pins 52 in slots 53 provided in said gun breech for the reception of the same, is a U-shaped breech block holder 54. Said pins 52 are securely locked in position by set-screws 55. Oil-holes 56 are provided in the end portions of the arms 51 to facilitate lubricating the pins 52. The substantially cylindrical breech block 57 is centrally and rigidly secured between the arms 51 of the member 54 the same resting against the bight portion 58 of said member. The forward surface of said block conforms exactly to the shape of the rearward extremity of the gun. Said breech block may however be formed integrally with the member 54 if desired. Rotatably mounted in forwardly extending bearing forming projections 59 formed at substantially the central portion of the member 54 is a shaft 60, bearing caps 61 secured by screws 61' to said projections 59 serving an obvious purpose. The laterally projecting portion 62 of the shaft 60 is preferably formed square in cross section. Snugly fitting said portion, hence fixed thereto, is an actuating lever 63, the same being held against lateral movement upon said shaft by a collar pin 64. Fixed to said shaft 60 adjacent to the arms 51 of the member 54 are pinions 65, the gun breech being recessed as at 66 and 66', respectively, to receive said pinions and said shaft.

Figures 8, 9, 14, 15:
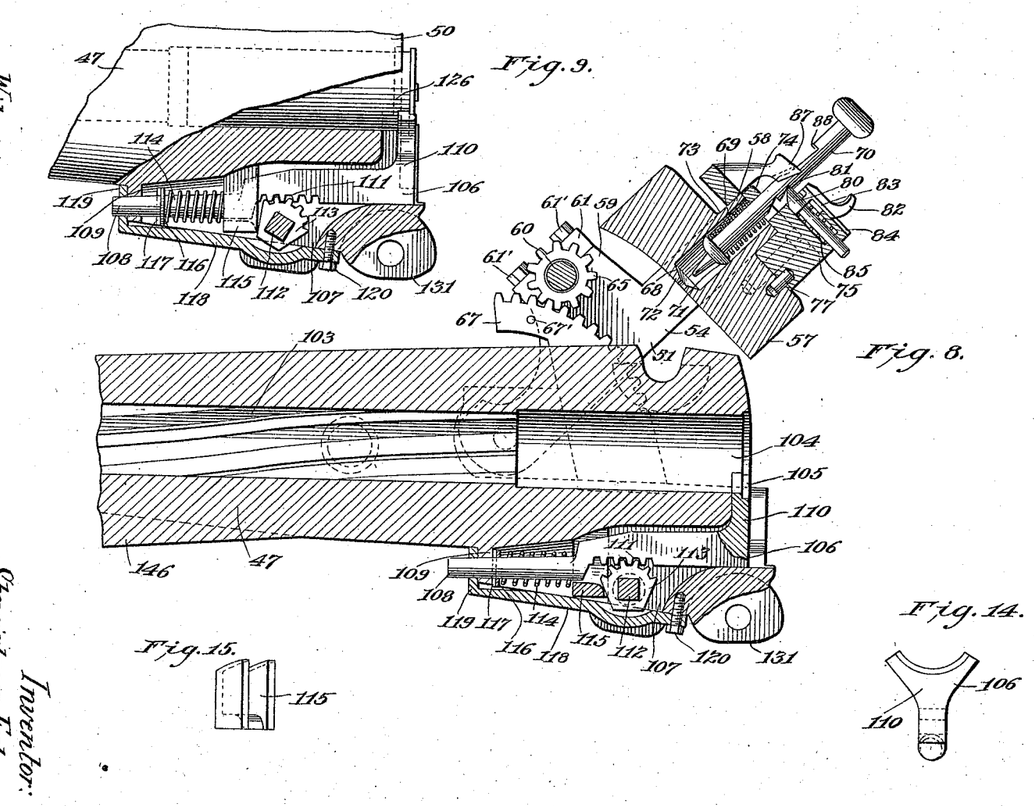
Fig. 8 is a vertical longitudinal section thereof showing the position of the several parts of the same when the breech block is in raised position or the gun is in condition to be loaded.
Fig. 9 is a detail sectional view showing the operation of the shell extracting mechanism.
Fig. 14 is an end elevation of the shell extractor.
Fig. 15 is a detail perspective of the rearward backing of the shell extractor spring.

Rigidly fixed to the gun breech and projecting above the same, the lower portion thereof being embedded in said breech are segmental racks 67, in mesh with the pinion 65, the centers of curvature of said racks lying in the axis of the hinge pins 52. 67' indicate stops, the same being provided to limit the forward movement of said breech block holder. By a construction as described, it is obvious that by rotating the lever 63 the rear end portion of the member 54 and hence the breech block 57 may be raised to a position as shown in Fig. 8, in which position access may be had to the shell chamber normally covered by said breech block.

The breech block 57 is provided with a preferably cylindrical, centrally positioned chamber 68, in which and extending through an opening 69 provided in the member 54 in alinement with said chamber, rests a firing pin 70, preferably substantially semi-circular in cross section. The forward end portion 71 of said firing pin 70 close to the extremity thereof, is of a diameter greater than that of the remainder of said pin, said portion being adapted when the firing pin is released to abut the head 72 formed in the forward extremity of said chamber 68, said head obviously acting as a stop for said firing pin. A coil spring 73 interposed between said enlarged portion 71 of the firing pin and a slotted forwardly extending portion 74 of a trigger housing 75 secured to the rear surface of the breech block 57 by means of threaded bolts 76 and a dowel 77 serves an obvious purpose. The slot 78 provided in said portion 74 of the trigger housing is of such a shape as to snugly receive the firing pin 70, thereby acting as a guide for said pin, and at the same time locking the same against rotary movement. Slidably mounted in a vertically extending circular chamber 79 provided in said member 75 is the reduced cylindrically formed shank of a dog 80, the latter being adapted to engage notches 81 provided in the under surface of the firing pin. Formed integrally with said dog 80 and projecting rearwardly therefrom is a trigger 82, the reduced vertically extending portion 83 of which is adapted to fit snugly the guide channel 84 provided for the reception of the same in the member 75. A coil spring 85 provided in the chamber 79 obviously keeps said dog 80 in forced contact with the firing pin.

In order to facilitate cocking, that is, withdrawing the firing pin 70, I provide an irregularly shaped arm 86, the extremity of the downwardly extending rearward end portion 87 of which is adapted to engage a notch 88 provided in the upper edge of the firing pin 70. The forward end portion 89 of said arm 86 is slidably mounted upon a guide pin 90 and the upper surface of the breech block holder 54. Said end portion of the arm 86 is provided upon its upper surface with an ear 91, said ear being adapted to be engaged by a projection 92 formed upon a preferably circular disk 93 secured to the shaft 60. A circular collar 94 provided upon the shaft 60 between the disk 93 and the lever 63 acts as a spacing means for correctly positioning the lever 63, the inner surface of said collar acting as a guide for the arm 86.

Figures 10, 16, 17, 18:
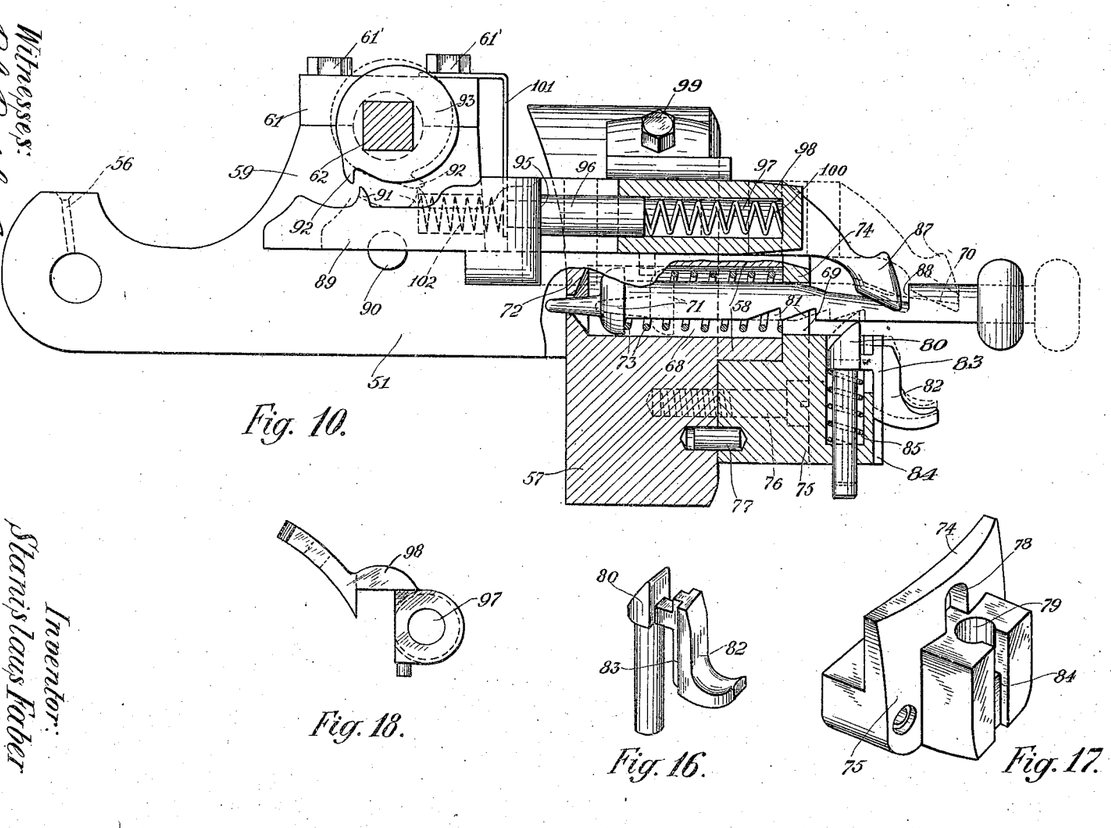
Fig. 10 is a vertical transverse section of the breech block and holder therefor taken on substantially the line *y—y* of Fig. 6, showing in full lines the position the parts of the firing mechanism thereof assume upon firing the gun, and showing in dotted lines the position said parts assume when in cocked or withdrawn position.
Figs. 16 and 17 are enlarged detail perspectives respectively of the trigger and trigger guide member or housing.
Fig. 18 is an enlarged detail front end elevation of the housing of the coil spring provided for the returning to initial position of the firing pin cocking member.

With such a construction by rotating the shaft 60 through the actuation of the lever 63 as before described, it is obvious that the arm 86, through the medium of the projection 92 engaging the ear 91 formed upon said arm, will be forced backwardly far enough to permit of the dog 80 engaging either of the notches 81, as shown in dotted lines in Fig. 10, in which event, the projection 92 will be at such an elevation to disengage or release the ear 91. In order to facilitate returning said arm to initial position after the releasement thereof, I provide the same upon an off-set portion or shoulder 95 thereof with a cylindrical member 96, rearwardly projecting therefrom. The rearward end portion of said member 96 slidably rests in a circular chamber 97 provided in a housing 98, the latter being secured by a threaded bolt 99 to the upper portion of the breech block. A coil spring 100 interposed between the extremity of the member 96, and the rearward wall of said housing 98 obviously upon the releasement of the ear 91 forces the arm 86 forwardly in initial position. Said member 98 besides acting in the capacity of a housing, also serves as a guide for the cocking member 86. A leaf spring 101 depending and spaced apart from one of the bearing forming projections 59 of the member 54 together with a coil spring 102 interposed between the lower end portion of said leaf spring and said projection 59 forms a cushion for said member 89 and at the same time facilitates the correct positioning of the ear 91 thereof with reference to the projection 92 of the member 93, obviously forming an essential provision in my mechanism.

The bore 103 of the gun is preferably rifled as clearly shown in Fig. 8. The rear end portion or shell chamber 104 of said bore is of increased diameter, it being adapted to snugly receive the shell to be fired. The extreme rear portion of said shell chamber is counter bored as at 105 so as to accommodate the circumferential flange provided at the rear extremity of an ordinary shell. In order to facilitate ready removal of a shell after firing the same, I provide a shell extractor 106. Said member is slidably mounted in a housing 107 provided for the reception of the same in the under surface of the gun breech, the forward preferably cylindrically formed end portion 108 of said member 106 resting in the circular slot provided in the forward wall 109 of said housing, the rear portion or head 110 of said member passing through a slot provided in the rearward wall of said housing. The upper portion of the head 110 of said member 106 is arcuate in shape, it being embedded in the rear surface of the gun, conforming exactly with the shape of the rear extremity of the bore therein, as just described, said construction being clearly shown in Fig. 8. The under edge of said member 106 is provided at substantially its central portion with teeth 111. In mesh with said teeth, the same being fixed to a shaft 112 mounted in bearings provided in the lateral walls of said housing 107, is a segmental pinion 113. A coil spring 114 interposed between a U-shaped stop 115 removably secured in the housing 107 and a collar 116 resting against a pin 117 transversely disposed and secured in said member 106, facilitates normally embedding the head 110 in the slot provided for the reception of the same in the end portion of the gun.

A plate 118 the forward substantially vertically extending portion 119 of which is slotted to receive the forward portion of the shell extractor, the rearward end portion being secured to the lower edge of the housing 107 by a threaded bolt 120, facilitates ready access to the mechanism inclosed in said housing. Fixed preferably by means of a set-screw 121 to the extremity of the laterally projecting end portion 122 of the shaft 112 is an actuating lever 123, which when in normal position is substantially vertically disposed. Said lever is so positioned upon the shaft 112 that the upper end portion 124 thereof lies in the circular path of the end portion 125 of the lever 63. By such construction, as the lever 63 is revolved, the end portion 125 thereof will, upon reaching substantially the lower extremity of its revolution, engage the end portion 124 of the lever 123, causing the latter to be turned through a partial rotation. By so doing, the shell extractor 106 is obviously forced rearwardly, thereby forcing the shell 126 contained in the shell chamber rearwardly with it, as clearly shown in Fig. 9. The lever 123 will however be only slightly rotated, it being obvious that when the lever 63 has been rotated a certain distance, the former will be released, or in other words, will slip the lever extremity 125, in which case it will be returned to normal position by the spring 114. It should be noted that not until the breech block holder, and hence, the breech block, are in raised position, that is, out of engagement with the gun breech does the lever 63 contact the lever 123, which as before stated causes the extraction of the shell, such provision being made for obvious reasons.

In returning to its normal position, the end portion 125 of the lever 63 must necessarily abut the end portion of the lever 123 and in order to permit the former passing the latter, the end portion 125 of the former is pivotally secured by a pivot pin 127 to the end portion of the lever proper 63, a spring 128 interposed between the projection 129 of said member 125 and a wall forming portion 130 of the lever 63 keeping said member 125 in operative position. The operation of such construction is obvious.

Figure 1:
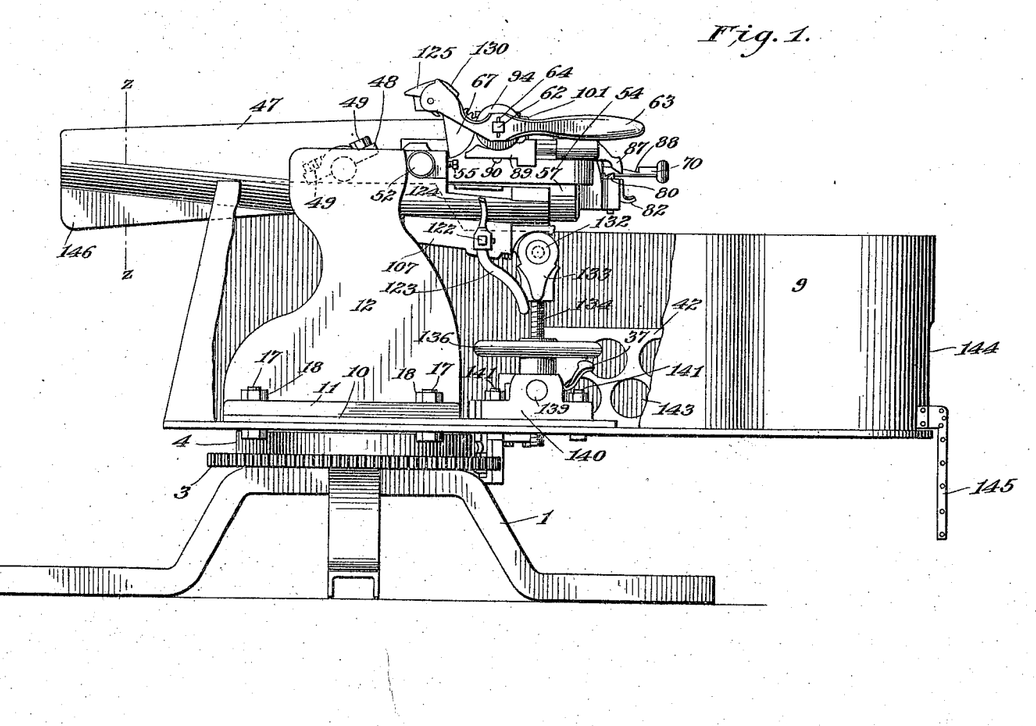
Figure 1 is a side elevation of my improved gun and turret therefor, a portion of the latter being broken away so as to better illustrate the construction of the mechanism.
Figure 2:
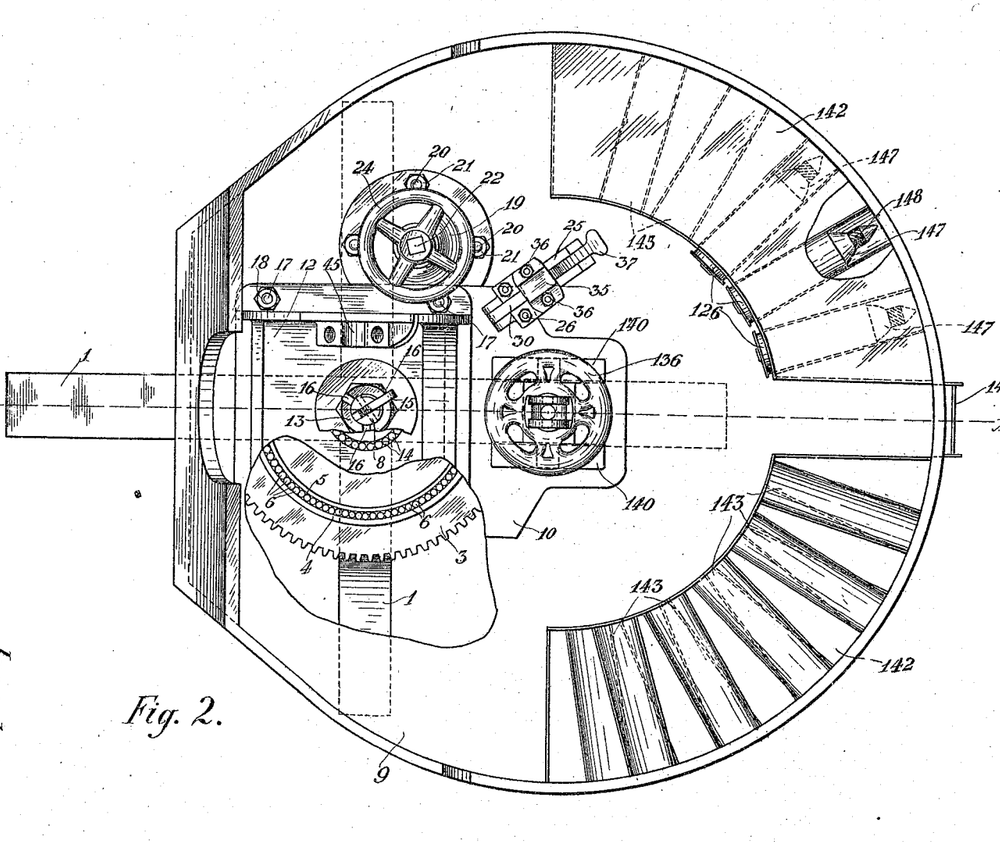
Fig. 2 is a top plan view of the turret and gun carriage, the gun proper being removed, a portion of the turret being broken away so as to expose underlying parts.
Figure 3:
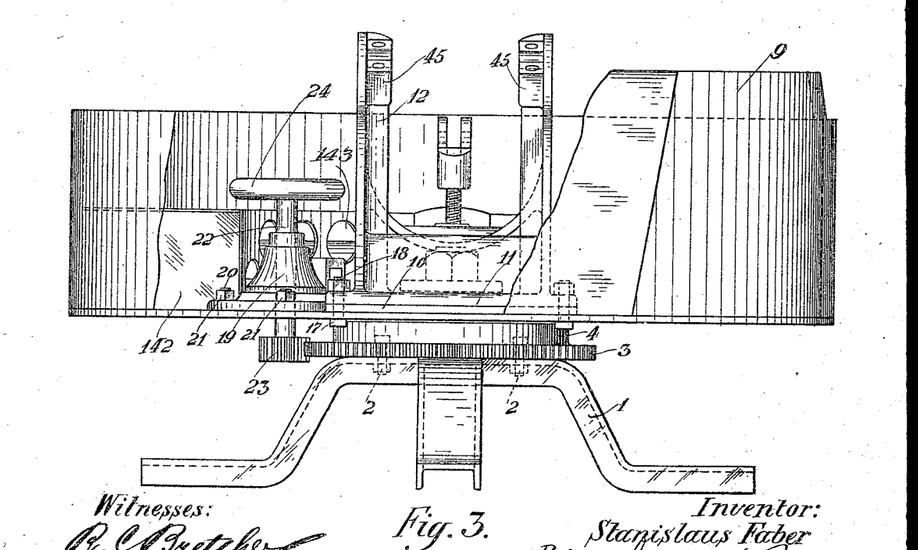
Fig. 3 is a front elevation thereof, a portion of the same being broken away.
Figure 4:
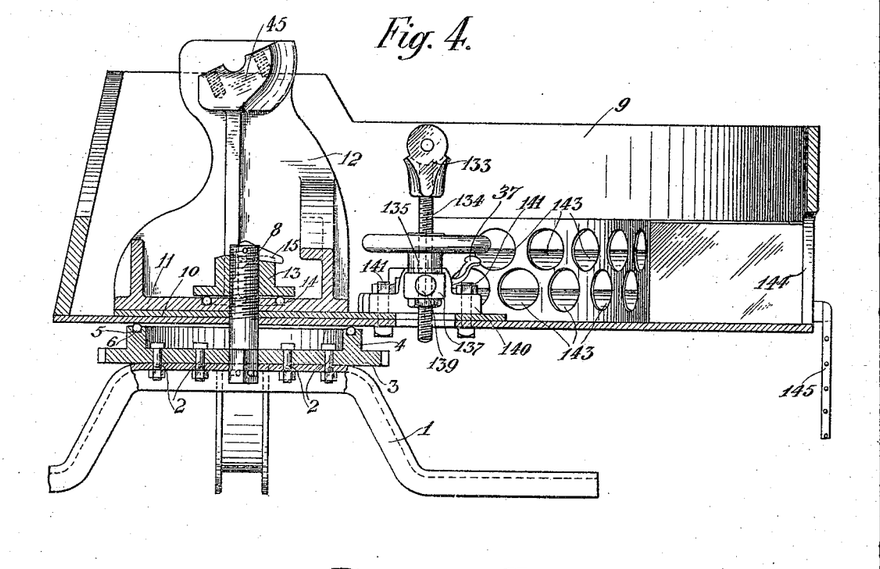
Fig. 4 is a vertical longitudinal section taken on substantially the line *x—x* of Fig. 2.
Figure 5:
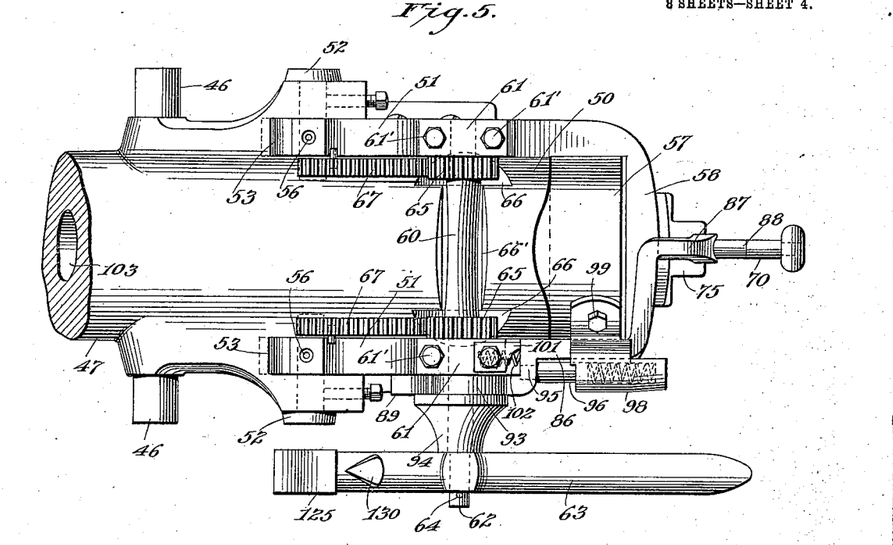
Fig. 5 is a top plan view of the gun breech.
Figure 6:
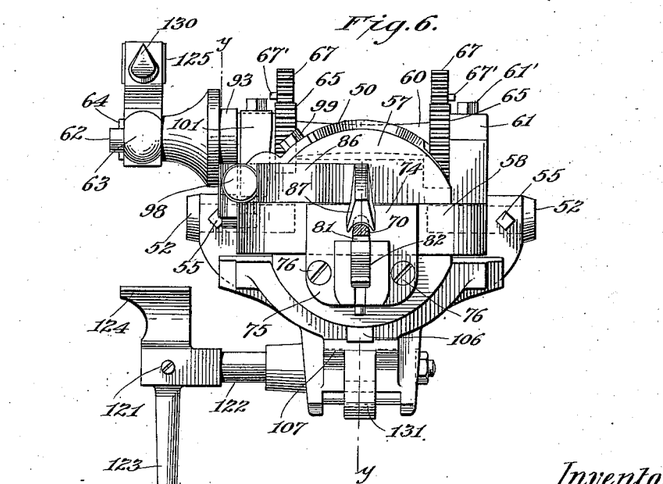
Fig. 6 is a rear elevation thereof.
Figures 7, 11, 12, 13:
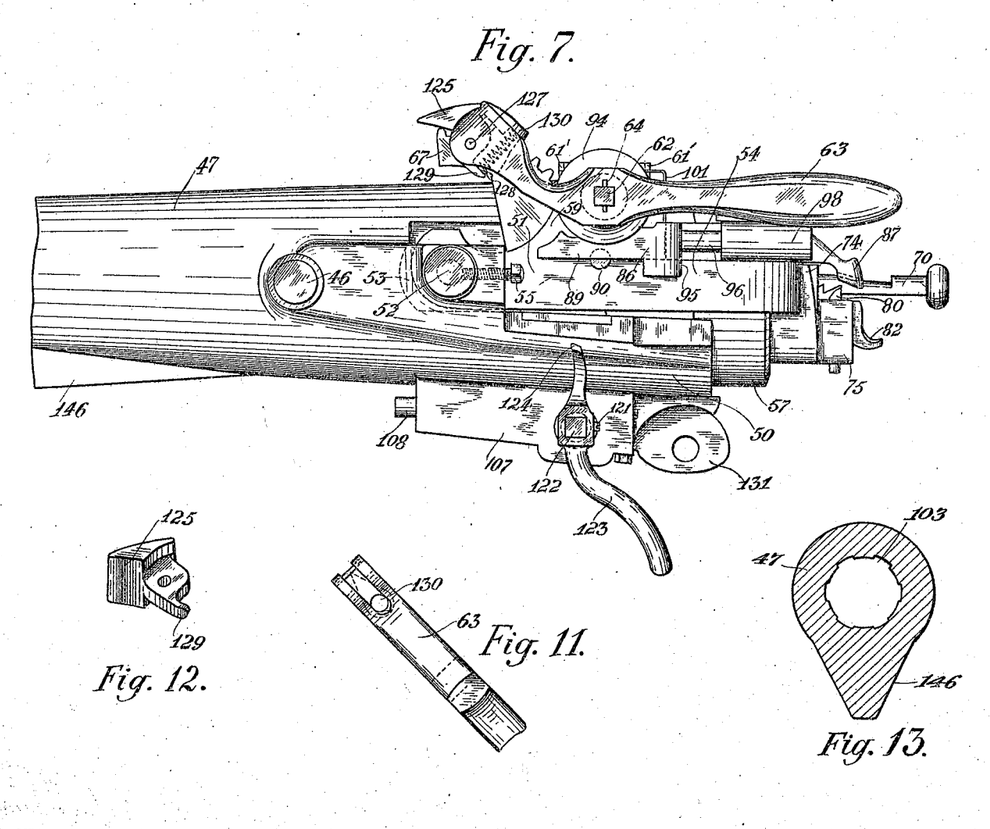
Fig. 7 is a side elevation thereof.
Figs. 11 and 12 are detail perspectives of the breech block elevating lever.
Fig. 13 is a vertical transverse section of the muzzle of the gun taken on the line *z—z* of Fig. 1.

Pivotally secured to a depending lug 131 formed integrally with the housing 107, by means of a pivot pin 132, is the bifurcated head 133 of a screw 134. Threaded upon the lower end portion of said screw is a sleeve 135 to the upper portion of which is fixed, preferably threaded, a hand-wheel 136. The lower end portion of said member 135 is rotatably secured in a block 137, a circumferential flange 138 formed at the lower extremity of said member 135 obviously serving as a means of locking said block 137 to the latter, such construction is clearly shown in Fig. 19. The end portions 139 of said block 137 are cylindrically formed. Said end portions hingedly rest in hinge brackets 140, the latter being secured by threaded bolts 141 to the floor of the turret. By such construction it is evident that by the rotation of the hand-wheel 136 the elevation of the gun may be readily and accurately adjusted. For the reception or storage of shells in the turret previous to or subsequent to using the same, I provide said turret at the rear portion thereof with storage rack 142. Said racks are preferably formed of sheet metal the same being provided with semi-cylindrically formed chambers 143, as clearly shown in Fig. 2, each of said chambers being adapted to snugly receive a shell. The rear portion of the vertically extending wall of the turret is provided with an opening 144 facilitating admission of men or ammunition to the turret. Said opening may however be provided with a door if desired. A suitable ladder 145 secured to and depending from the rear portion of the turret facilitates access to the opening 144 therein.

In the ordinary gun after firing a number of shots, the same becomes heated to a very high temperature, thereby necessarily causing the expansion of the same. The bore of the gun upon such expansion taking place consequently increases in diameter and for this reason, shots fired with the gun in this condition cannot be accurately aimed. In order therefore to facilitate cooling the gun or to keep it at a substantially constant temperature, I provide the muzzle thereof with a longitudinally extending, preferably depending flange 148, the same being of any suitable width. By such construction the muzzle of the gun before becoming heated throughout will because of conductivity be cooled by said flange portion, and after becoming so heated will be adapted to be more quickly cooled because of the increased radiating surface resulting from the provision of said flange.

The projectiles 147 of the shells 126 to be used in connection with my gun are of a novel construction. The forward substantially conically formed end portions of said projectiles, as clearly shown in Fig. 2 have a screw thread 148 formed therein. Said provision is made so as to adapt a revolving projectile upon striking an object to readily enter or pierce the same, and upon piercing to be difficult to dislodge therefrom.

While I have shown what I deem to be the preferable form of my gun, I do not wish to be limited thereto as there might be many changes made in the details of construction and arrangements of parts without departing from the spirit of my invention.

Having described my invention what I claim as new and desire to secure by Letters Patent, is:

1. A gun, a breech block fitting snugly the breech of said gun, a U-shaped support for said breech block pivotally mounted on said gun, means for elevating said U-shaped support and breech block, a firing pin carried by said breech block, a trigger adapted to hold said firing pin in cocked position and means whereby elevating said breech block causes said firing pin to be cocked, substantially as described.

2. In a gun, the combination of a breech block snugly fitting the breech of said gun, a U-shaped support for said breech block in hinged connection with said gun, segmental racks disposed in parallel vertical planes upon said gun, a shaft journaled in bearings provided in said breech block support, pinions fixed to said shaft in mesh with the teeth of said racks, a firing pin, means for withdrawing or cocking said pin, a shell extractor, means connected with said shaft whereby by rotating the latter causes the actuation of said firing pin cocking means and said shell extractor, substantially as described.

3. A gun, a breech block snugly fitting the breech thereof, a U-shaped support to said breech block hingedly mounted on said gun, a segmental rack on said gun, a shaft journaled in said breech block support, a pinion fixed to said shaft and in mesh with said rack, a firing pin, longitudinally slidable means on said breech block for cocking said firing pin, co-acting means on said longitudinally slidable means and said shaft for actuating the former when the shaft is rotated, substantially as described.

4. In a gun, the combination of a substantially cylindrical breech block snugly fitting the breech of said gun, a horizontally disposed U-shaped support for said breech block, the end portions of said support being in hinged connection with said gun, a firing pin snugly mounted in said breech block, a trigger coöperating with said firing pin, an arm adapted to engage a notch provided in the upper edge of said firing pin, means for elevating said breech block support which when actuated forces the last mentioned arm rearwardly into engagement with said notch, substantially as described.

5. In a gun, the combination of a breech block snugly fitting the breech of said gun, a horizontally disposed U-shaped support for said breech block, the end portions of said support being hingedly secured to the sides of said gun forward of the breech thereof, segmental racks forwardly extending from and fixed to said gun, a transverse shaft journaled in bearings in said breech block support, pinions fixed to said shaft in mesh with said racks, and an operating lever fixed to one of the extremities of said shaft, substantially as and for the purpose specified.

6. In a gun, the combination of a breech block, a U-shaped support for said breech block hingedly secured to said gun, said block being centrally fixed in the bight of said support, segmental racks secured to and upwardly extending from said gun, a shaft journaled in bearings provided in said breech block support, said shaft being in geared connection with said segmental racks, a firing pin carried by said breech block, a trigger coöperating with said firing pin, an arm mounted upon said breech block support the rearward end portion of which is adapted to engage a notch provided in said firing pin, means projecting from the shaft carried by said breech block support adapted when said shaft is rotated to engage a projection provided upon said arm so as to force said arm rearwardly, and means adapted when said arm is released to return said arm to normal position, substantially as and for the purpose specified.

7. In a gun, the combination of a breech block, a vertically movable U-shaped support therefor hingedly connected with said gun, a shell extractor embedded in the breech of said gun, a housing formed upon the under side of said gun for the reception of the shank of said extractor, a shaft journaled in the lateral walls of said housing in geared connection with said extractor shank, rotatable means for elevating said breech block support, said means being adapted when said breech block is in elevated position to rotate the before-mentioned shaft so as to cause said extractor to be forced rearwardly, spring means adapted when said extractor is released to return the same to normal position, substantially as described.

8. In a gun, the combination of a breech block, a vertically movable support therefor in hinged connection with said gun, a shell extractor embedded in the breech of said gun, a housing formed upon the under side of said gun integrally therewith for the reception of the shank of said extractor, a shaft journaled in the lateral walls of said housing, a segmental pinion fixed to said shaft in mesh with teeth formed in said extractor shank, a lever fixed to one extremity of said shaft, rotatable means for elevating said breech block support, said means being adapted when said breech block is in elevated position to rock the before-mentioned shaft by contact with the lever carried thereby, substantially as and for the purpose specified.

In testimony whereof I have signed my name to this specification in the presence of two subscribing witnesses.

STANISLAUS FABER.

Witnesses:
  BORI FABER,
  HELEN F. LILLIS.